(12) United States Patent
Head

(10) Patent No.: US 6,834,529 B2
(45) Date of Patent: Dec. 28, 2004

(54) METHOD FOR MEASURING THE ATMOSPHERE WITHIN AN ENCLOSURE USING A SELF-DRILLING SENSOR WELL

(75) Inventor: James D. Head, Des Plaines, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 10/392,587

(22) Filed: Mar. 20, 2003

(65) Prior Publication Data

US 2004/0182132 A1 Sep. 23, 2004

(51) Int. Cl.⁷ .............................................. G01N 19/10
(52) U.S. Cl. ........................................ 73/23.2; 73/52
(58) Field of Search .............................. 73/23.2, 24.05, 73/24.06, 52

(56) References Cited

U.S. PATENT DOCUMENTS

| | | | |
|---|---|---|---|
| 4,788,871 A | 12/1988 | Nelson et al. | 73/866.5 |
| 4,866,839 A | 9/1989 | Covey | 29/825 |
| 4,875,031 A * | 10/1989 | Filippi et al. | 340/605 |
| 5,381,950 A | 1/1995 | Aldridge | 236/1 R |
| 5,446,677 A | 8/1995 | Jensen et al. | 364/510 |
| 5,731,953 A | 3/1998 | Sakurai | 361/695 |
| 6,338,437 B1 | 1/2002 | Kline et al. | 236/49.3 |
| 6,427,260 B1 | 8/2002 | Osborne-Kirby | 4/678 |
| 6,547,777 B2 | 4/2003 | DiResta et al. | 604/506 |

* cited by examiner

*Primary Examiner*—Hezron Williams
*Assistant Examiner*—Rodney Frank

(57) ABSTRACT

A method is disclosed for measuring the atmosphere within an enclosure. A sensor well is provided comprising a drilling head and a drill point such that the sensor well may be directly inserted into the enclosure using a drill. A sensor may be provided in the sensor well before or after the sensor well is inserted into the enclosure. Once the sensor well is inserted into the enclosure using the drill, and a sensor is provided within the bore of the sensor well, the sensor may be connected to a measuring device such that the atmosphere within the enclosure may be measured.

19 Claims, 4 Drawing Sheets

METHOD FOR MEASURING THE ATMOSPHERE WITHIN AN ENCLOSURE USING A SELF-DRILLING SENSOR WELL

CROSS-REFERENCE TO RELATED CO-PENDING APPLICATIONS

The following patent application covers subject matter related to the subject matter of the present invention: Self Drilling Sensor Well for Sensing the Atmosphere in an Enclosure, U.S. patent application Ser. No. 10/393,151.

FIELD OF THE INVENTION

The present invention is related to a heating, ventilating and air conditioning (HVAC) system. More particularly, the present invention relates to a device to position and contain a sensing element into an enclosure, such as an air duct or a variable air volume (VAV) box, of an HVAC system for detecting air temperature, static pressure, humidity, smoke, impurities, and sampling gaseous mixtures. The present invention further relates to a sensor well device that is inexpensive and quick to install in a field environment.

BACKGROUND OF THE INVENTION

HVAC systems are designed and installed to maintain environmental conditions within buildings for the comfort of the occupants. A typical building HVAC system is divided into zones and is adapted to maintain each zone within predefined environmental parameters such as humidity and temperature. An air handling unit supplies conditioned air to ductwork that distributes the air to each of the zones. The air handling unit generally includes elements for introducing outdoor air into the system and for exhausting air from the system. Air handlers typically comprise a centrifugal blower that moves air over an evaporator or water coil and pressurizes the air for distribution through a duct at a desired flow rate.

Air flow from an air handling unit to different regions of the zone is regulated by a separate VAV terminal unit, also called a VAV box. The typical VAV box has a the associated zone region. VAV boxes serving zones on exterior walls typically have a heating element to increase the temperature of the air that flows in to the associated room. These components are operated by a controller in response to signals from devices that sense air temperature and flow rate. Such a system is shown for example in U.S. Pat. No. 6,338,437, which is incorporated by reference herein.

In the temperature control industry, air sensors are commonly used to as inputs to a building automation control system to maintain temperature, humidity, and static pressure in the controlled environment of a building. During installation of a typical building automation system in a moderate sized building there are hundreds of duct-mounted sensors to install. A common application of duct-mounted sensors is called VAV box discharge temperatures sensors, which measure the air temperature of the discharge (supply air) of an individual VAV box.

Advances in automated testing tools have resulted with an increased need to measure individual VAV box discharge air temperature. Computerized automated testing of VAV box performance is aided by equipping each VAV box with a individual discharge air temperature sensor. Automated testing facilitates testing of multiple VAV box performance in one testing session. This testing application requires either a discharge air temperature sensor or a functional room temperature sensor for each zone controlled by a VAV box.

Often a jobsite construction schedule is rushed and VAV box testing is scheduled to begin without the room temperature sensor points installed or functional. Thus creating a need for an inexpensive and quick installing selfdrilling sensor well used for temperature sensing in a VAV box discharge duct Known duct temperature element mounting assemblies include Siemens Building Technologies PN 536-811, manufactured in Buffalo Grove, Ill. and others, require an installer to drill three accurate location holes, endure two drill bit changes, install two mounting screws, two wire extenders, four electrical terminations and two wire connecters for installation. The estimated time for installation of the Siemens device is twenty-one minutes. This translates into an expensive installation that may not be economically justified for the project.

FIG. 1 shows a conventional duct mounted temperature sensor 1 mounted in an air duct 2. The sensing element is extended into the duct air stream 3 to measure the air temperature. The mounting bracket 4 through which the sensor 1 extends requires three mounting holes 5, 6 and 7 for installation. The elastic gasket material 8 seals the mounting bracket 4 to the air duct 2 and prevents air leakage. The sensor electrical leads 9, 10 extend approximately five inches and would require a field installed wire extension to connect to a terminal box controller device to sense the air temperature. With this type of duct mounted temperature sensor device the cost and the labor to install it is considerably high. These costs may preclude the installation of this device in the field and automated testing of individual VAV box performance would be degraded.

SUMMARY OF THE INVENTION

Therefore, one object of the present invention is to provide a self-drilling sensor well that does not require a separately drilled mounting hole for installation. This is well suited for VAV box and air duct sensor applications as the speed of installation is increased. Still another object of the present invention is to provide a sensor well that enables the sensor element to be removed and replaced quickly for maintenance and repair.

To achieve these objectives, the present invention comprises providing a sensor well having a first end and a second end, said sensor well provided with a head portion provided at said first end for allowing said sensor well to be directly inserted into said enclosure, and a bore provided between said first end and said second end. In a preferred embodiment, the sensor well is then inserted into the enclosure, a sensor is inserted into the bore of said sensor well, and the atmosphere of the enclosure is then measured by connecting the lead wire of the sensor to a measuring device. Using the drill head, the sensor well can be directly inserted into an enclosure using a tool such as a drill. In an alternative embodiment, the sensor is inserted into the sensor well before the sensor well is drilled into an enclosure, and a detachable wiring socket is provided to connect the sensor to a measuring device.

BRIEF DESCRIPTION OF THE DRAWINGS

The invention will hereafter be described with reference to the accompanying drawings, wherein like numerals denote like elements and.

DETAILED DESCRIPTION OF THE PREFERRED EMBODIMENTS

Figure 1:
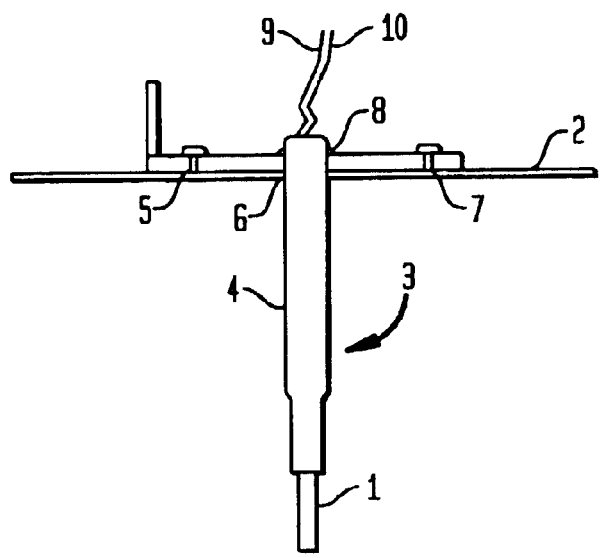
FIG. 1 is an example of a prior art mounting bracket for inserting a sensor into the atmosphere of an air duct.
Figure 2:
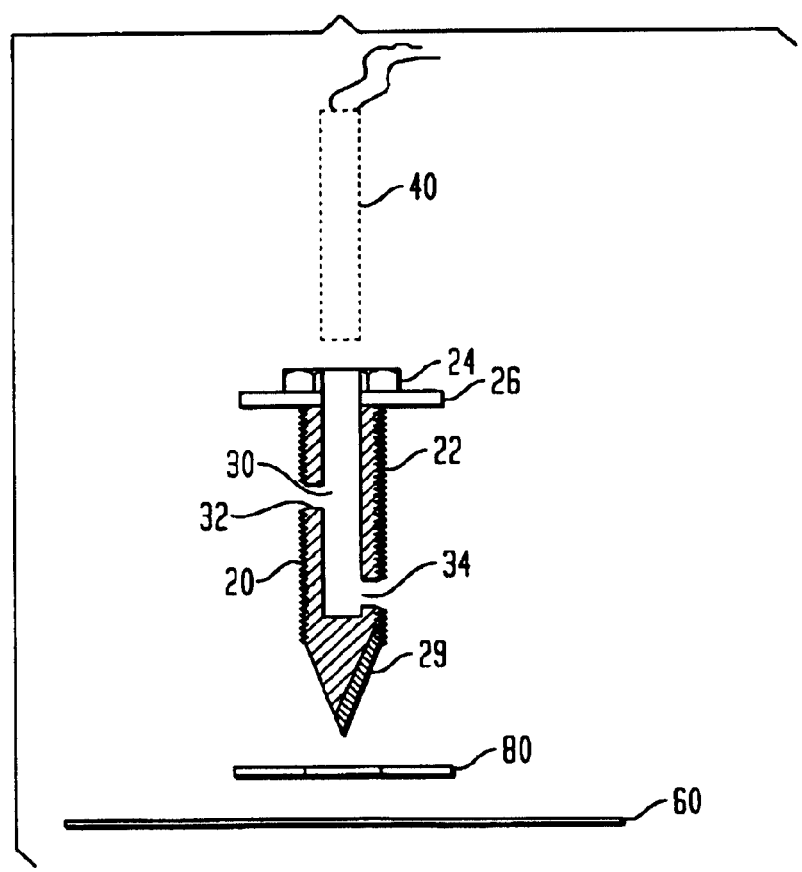
FIG. 2 is an illustration of the preferred embodiment of the present invention before the sensor well is inserted into the enclosure.

Hereinafter, the present invention will be described in detail with references to accompanying drawings. Referring to FIG. 2, the present invention comprises a sensor well device 20 having a cylindrical body with threads 22 formed around the exterior circumference of the sensor well 20. The sensor well 22 further comprises a gripping head 24 and washer lip 26 to facilitate horizontal thrust applied during a drilling operation. Sensor well 20 is used to enclose environmental sensing elements, such as sensor 40 in an enclosure 60, such as a VAV box or an air duct. The sensor well 20 is capable of forming its own mounting hole, to provide a economical means to install and mount a sensor 40 into an enclosure 60 to measure the atmosphere 80 within the enclosure 60. The sensor well 20 itself may be used as a drilling tool and is intended to remain in the enclosure 60 and hold the sensing element 40 in the atmosphere 80 of the enclosure. The gripping head 24 may fit into a common sized socket adaptor tool, not shown, which is chucked into a powered hand held drill motor. A hand held drill, provided with a socket adapter, may be used to drill the sensor well 20 into the enclosure 60 forming a mounting hole in which the sensor well 20 will rest.

As shown in FIG. 2, the sensor well 20 is provided with one or more drilling points 28 which allow the sensor well 20 to penetrate the enclosure 60. Threads 22 which engage with the enclosure 60, after the one or more entry points 28 penetrate the enclosure 60, to secure the sensor well 20 within the enclosure 60. Threads 22 of the sensor well 20 are provided with a common screw pitch designed to form threads in the enclosure as the sensor well 20 rotated during installation into the enclosure 60 thus mounting the sensor well 20 into the enclosure 60. The drilling point 28 is formed to a sharpened point to aid the beginning of the drilling operation minimizing. The drilling point 28 consists of a single or double flute point with a sharp point to prevent drill "wandering" during the start of the drilling operation. The drill point 28 is designed to displace a portion of the enclosure into a "lip" on the opposite side of the duct material. This raised lip grips the screw threads 22 and holds the sensor well firmly in place. When the drill point 28 is comprised of more than one flute, the flutes are preferably equidistantly arranged around the circumference of lower end of the sensor well 22.

Referring still to FIG. 2, washer lip 26 provides a bearing surface for the socket adaptor to rest during the drilling used to install the sensor well 20. Before the sensor well 20 is drilled into an enclosure 60, an insulating gasket 80 is provided between the sensor well 20 and the enclosure 60 before the sensor well 20 is inserted into the enclosure 60. The washer lip 26 and the gasket 80 serve to provide an air tight seal between the enclosure 60 and the sensor well head 24. Gasket 80 is constructed of an elastic material that will conform to irregularities in the enclosure surface 60 and when compressed by the sensor 40, serves to prevent the sensor body 40 from becoming loose due to vibration. Preferably, gasket 80 is comprised of an elastic material such as rubber, foam or a composite material which may be compressible. The upper surface of the gasket 80 facing the lower surface of washer lip 26 is preferably provided with an adhesive material to better secure the gasket 80 to the washer lip 26.

Figure 3:
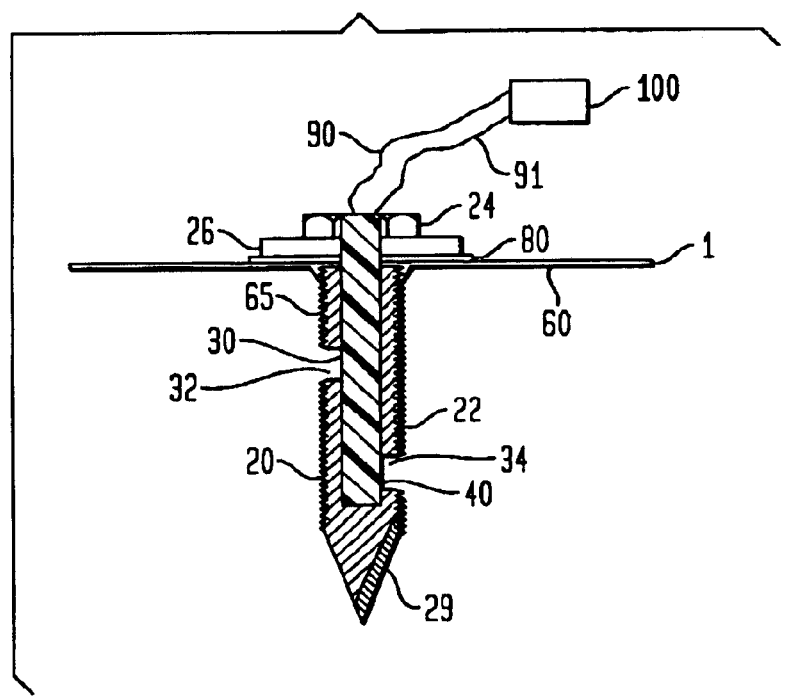
FIG. 3 is an illustration of the preferred embodiment of the present invention after the sensor well is inserted into the enclosure.

As shown in FIG. 3, after the sensor well 20 is installed into the enclosure 60, the separate sensing element 40 is slipped into the cylindrical bore 30 of the sensor well 20. When the sensing element 40 is placed into the bore 30, it may be held in place by friction or by mechanical means known in the art. In a preferred embodiment, the sensor well 20 is provided with two transverse slots 32, 34 located 180 degrees apart on separate sections of the sensor well 20 to expose the sensor element 40 to the atmosphere 85. These slots 32, 34 allow for the sensor element 40 to be exposed to atmosphere 85 of the enclosure 60 regardless of position of rotation of the sensor well 20 after installation. While the preferred embodiment implements two slots 32, 34 located 180 degrees apart along the circumference of the sensor well 20, any number of slots may be located in varying fashion.

The temperature sensor element 40 may consist of several types of commercially available types of sensing elements, including but not limited to: platinum sensing coil types, RTD elements, thermister elements and other types of sensing elements used for measuring temperature, humidity, air pressure, air composition and air quality. The body of sensor element 40 is preferably constructed of a heat conductive material that allows the sensor element 40 to equalize with the temperature of the air within the air duct being monitored. The lead wires 90, 91 extend from the sensing element 40 and may be connected to a measuring, monitoring or control device 100, allowing for the measuring of the atmosphere 85 within the enclosure 60.

Figure 4:
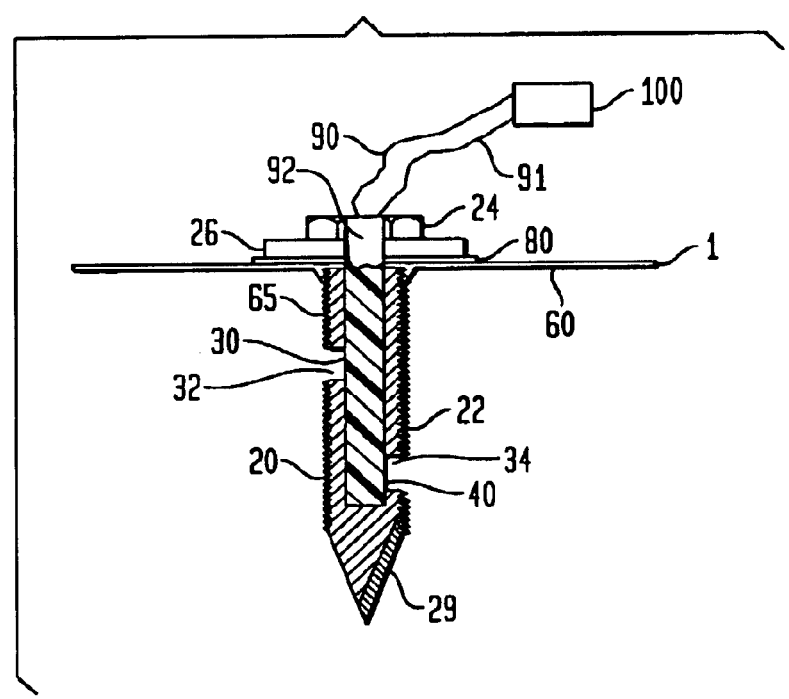
FIG. 4 is an illustration of an alternative embodiment wherein a sensor is provided within the bore of a sensor well before the sensor well is inserted into an enclosure.

FIG. 4 shows an alternative embodiment in which the temperature sensor element 40 and the sensor well 20 may together be provided as an integral member before the sensor well 20 is inserted into an enclosure. In such a case, lead wires 90, 91 may be provided in a detachable socket 92 that may be inserted into the bore 30 of sensor well 20 and connected to the sensor element 40 after the sensor well 20 has been inserted into enclosure 60.

Figure 5:
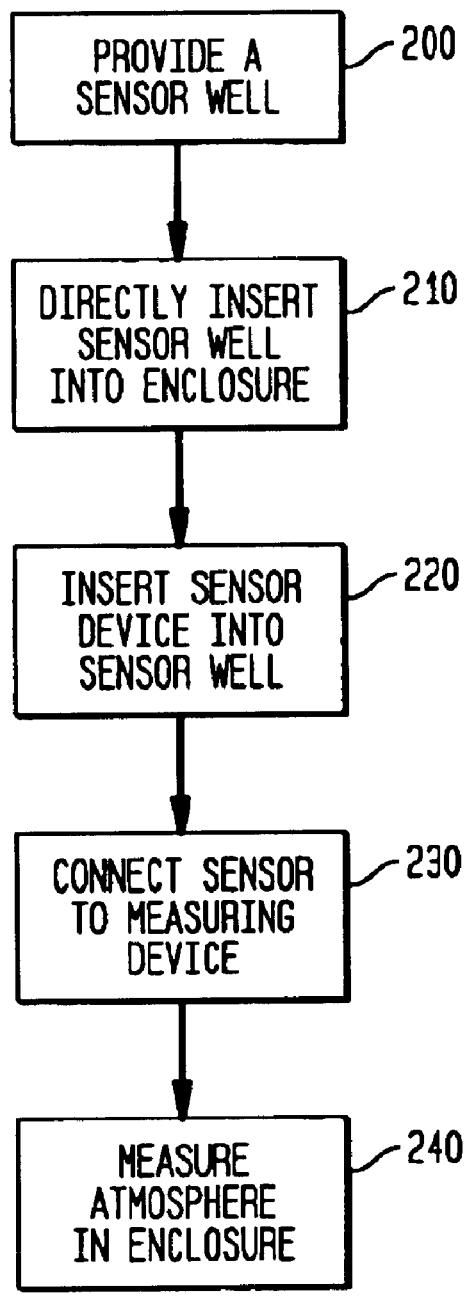
FIG. 5 is a flow chart setting forth the preferred embodiment of the present invention.
Figure 6:
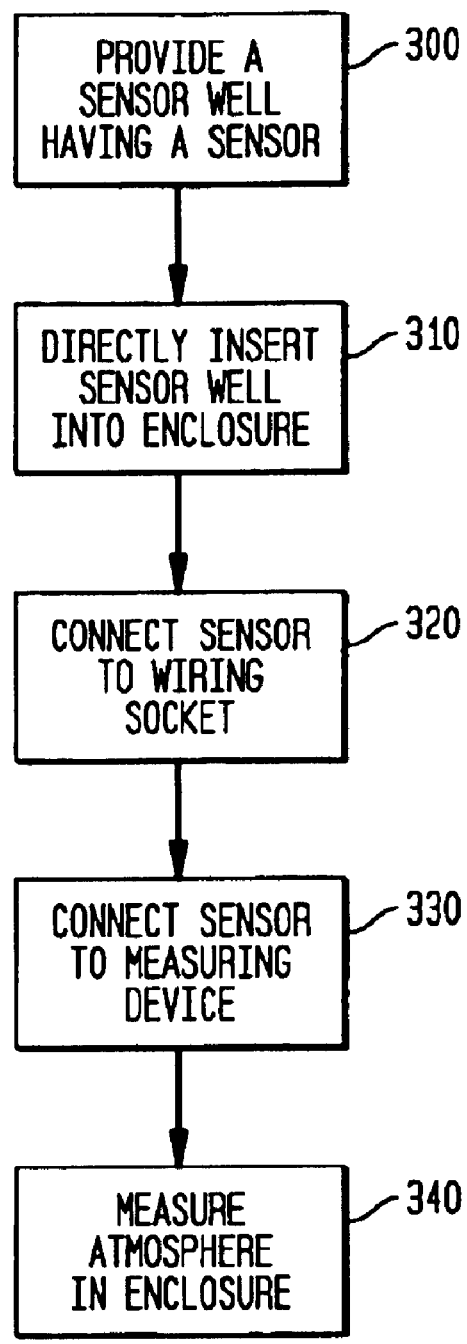
FIG. 6 is a flow chart setting forth an alternative embodiment of the present invention.

With reference to FIGS. 2 and 3, the method according to the present invention is illustrated in FIG. 5. In step 200, a sensor well 20 is provided that is directly capable of being directly inserted into an enclosure, such as a VAV box or an air duct. The sensor well 20 may be provided with a head element 24 facilitating the direct insertion of the sensor well element 20 into the enclosure 60. In step 210, suing a powered hand drill or a hand tool, the sensor well 20 may be directly inserted into the enclosure 60. In step 220, after the sensor well has been directly inserted into the enclosure 60, sensor 200 may he inserted into the bore 30 of the sensor well 22. As shown in FIGS. 2 and 3, the sensor well is provided with slots 32,34 exposing the sensor 40 to the atmosphere 65 of the enclosure 60. In step 230, sensor 40, which may be provided with a pair of lead wires, may be connected to a VAV box controller device or may act as a sensor input to a building automation or HVAC system. Sensor 40 may also be connected to a hand-held testing device. In step 240, the atmosphere 65 of the enclosure 60 may then be tested or evaluated using the sensor 40 and the testing device 100. As previously discussed, measuring device 100 may be a hand-held device, a VAV box controller or With reference to FIG. 4, an alternative method according to the present invention is shown in FIG. 6. The method as shown in FIG. 6 is similar to the method shown in FIG. 5, except that in step 300, the sensor element 40 is already inserted into the bore 30 or sensor well 20. In step 310, the sensor well is directly inserted into the enclosure 60. In step 320, a wiring socket 92 may be inserted into the bore 30 of the sensor well 20 and may be connected to the sensor element 40. In step 330, the lead wires 90 and 91 of socket 92 can be connected to a device 100 for measuring the atmosphere within the enclosure 60. In step 340, the atmosphere within the enclosure 60 can then be measured.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

I claim:

1. A method for sensing the atmosphere in an enclosure, comprising:

providing a sensor well having a first end and a second end, said sensor well provided with a head portion provided at said first end for allowing said sensor well to be directly inserted into said enclosure, and a bore provided between said first end and said second end;

inserting said sensor well into said enclosure using a power driven hand tool;

inserting a sensor into said bore of said sensor well; and sensing the atmosphere of said enclosure using said sensor.

2. The method according to claim 1, further comprising providing said sensor well with one or more apertures between said first end and said second end such that a sensor inserted into said bore is exposed to the atmosphere of said enclosure.

3. The method according to claim 1, further comprising providing said sensor well with one or more flutes at the second end of said sensor well for allowing the sensor well to be inserted into said enclosure.

4. The method according to claim 1, further comprising providing said sensor well with threads for engaging said enclosure when said sensor well is being inserted into said enclosure.

5. The method according to claim 1, further comprising providing said sensor with one or more lead wires for connecting said sensor to a device for measuring the atmosphere of an enclosure.

6. The method according to claim 1, further comprising providing said enclosure as a VAV box, said VAV box receiving airflow from a source and providing said air flow to an environment, said VAV box including a damper for controlling said air flow, said damper being controlled by an actuator.

7. A method for sensing the atmosphere in a enclosure, comprising:

providing a sensor well having a first end and a second end, said sensor well provided with a head portion provided at said first end for allowing said sensor well to be directly inserted into said enclosure, and a bore provided between said first end and said second end, wherein a sensor is provided within said bore;

inserting said sensor well into said enclosure using a power driven hand tool; and sensing the atmosphere of said atmosphere using said sensor.

8. The method according to claim 7, further comprising providing said sensor well with one or more apertures between said first end and said second end such that a sensor inserted into said bore is exposed to the atmosphere of said enclosure.

9. The method according to claim 7, further comprising providing said sensor well with one or more flutes at the second end of said sensor well for allowing the sensor well to be inserted into said enclosure.

10. The method according to claim 7, further comprising providing said sensor well with threads for engaging said enclosure when said sensor well is being inserted into said enclosure.

11. The method according to claim 7, further comprising inserting a wiring socket into said bore to connect said sensor to a device so that the atmosphere within said enclosure can me measured.

12. The method according to claim 7, further comprising providing said enclosure as a VAV box, said VAV box receiving airflow from a source and providing said air flow to an environment, said VAV box including a damper for controlling said air flow, said damper being controlled by an actuator.

13. A method for sensing the atmosphere in an VAV box, said VAV box receiving airflow from a source and providing said air flow to an environment, said VAV box including a damper for controlling said air flow, said damper being controlled by an actuator, comprising:

providing a sensor well having a first end and a second end, said sensor well provided with a head portion provided at said first end for allowing said sensor well to be directly inserted into said enclosure, and a bore provided between said first end and said second end;

inserting said sensor well into said enclosure;

inserting a sensor into said bore of said sensor well; and sensing the atmosphere of said VAV box using said sensor.

14. The method according to claim 13, further comprising using a tool operatively coupled to said head portion for directly inserting said sensor well into said enclosure.

15. The method according to claim 14, wherein said tool is provided as a power driven hand tool.

16. The method according to claim 13, further comprising providing said sensor well with one or more apertures between said first end and said second end such that a sensor inserted into said bore is exposed to the atmosphere of said enclosure.

17. The method according to claim 1, further comprising connecting said sensor to a device for measuring the atmosphere within said enclosure.

18. The method according to claim 7, further comprising connecting said sensor to a device for measuring the atmosphere within said enclosure.

19. The method according to claim 13, further comprising connecting said sensor to a device for measuring the atmosphere within said VAV box.

* * * * *